UNITED STATES PATENT OFFICE.

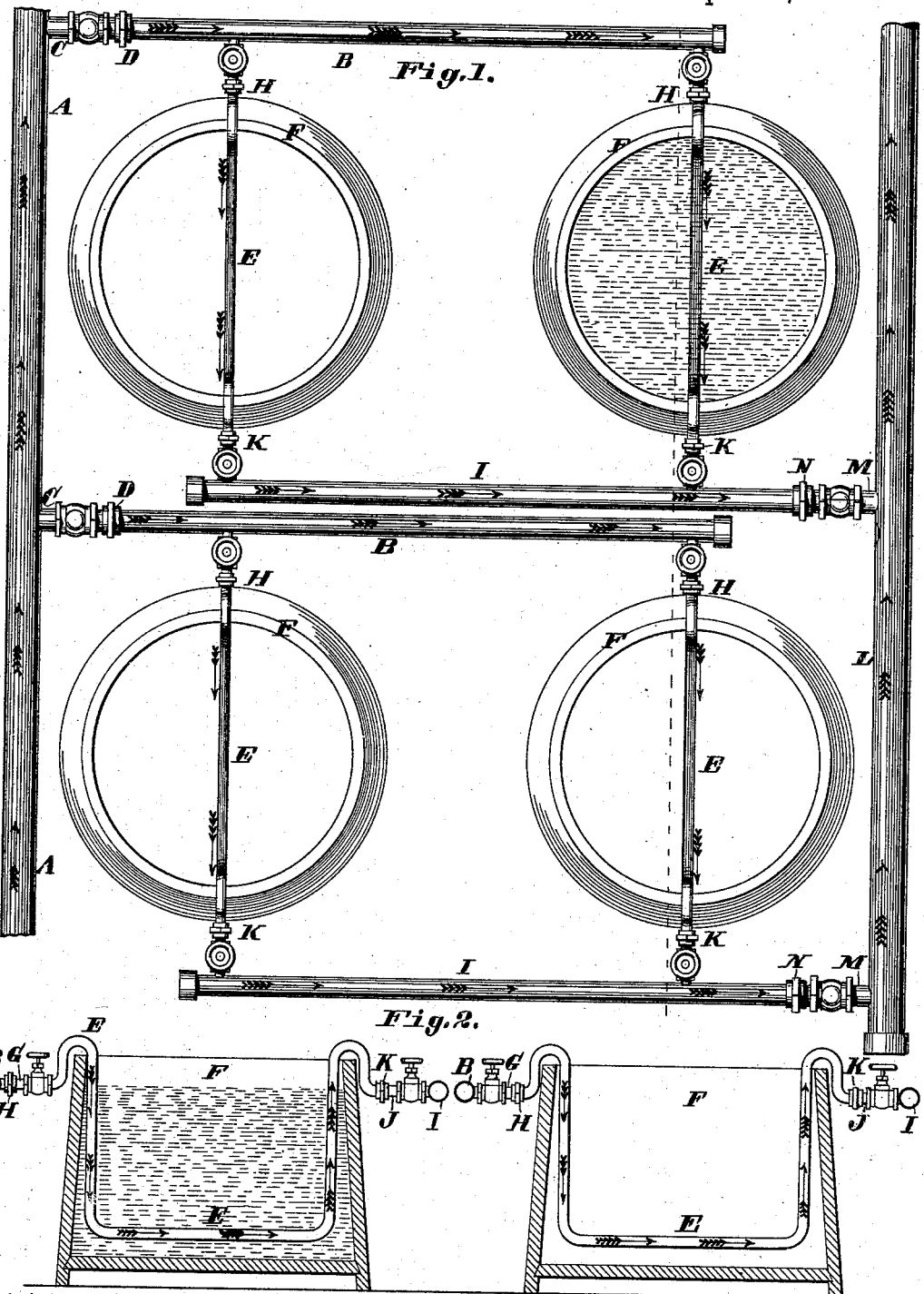

CHARLES G. MAYER, OF NAUVOO, ILLINOIS, AND EDMUND JUNGENFELD, OF ST. LOUIS, MISSOURI, ASSIGNORS TO THE EMPIRE REFRIGERATING COMPANY, OF ST. LOUIS, MISSOURI.

APPARATUS FOR COOLING BEER, &c.

SPECIFICATION forming part of Letters Patent No. 265,123, dated September 26, 1882.

Application filed July 6, 1882. (No model.)

*To all whom it may concern:*

Be it known that we, CHARLES G. MAYER, of Nauvoo, in the county of Hancock and State of Illinois, and EDMUND JUNGENFELD, of the city of St. Louis, in the State of Missouri, have invented a certain new and useful Improvement in Process of and Apparatus for Cooling Beer, &c., of which the following is a full, clear, and exact description, reference being had to the accompanying drawings, forming part of this specification, and in which—

Figure 1 is a top view, and Fig. 2 is a vertical section.

Our invention relates to an apparatus for cooling beer while it is undergoing fermentation in the vats; and our invention consists in circulating cold brine through the vats by means of pipes branching off from the main pipe of a refrigerating system—as, for instance, the return-pipe shown and described in Letters Patent granted to the said Charles G. Mayer and his assignee, Leo Rassieur, April 11, 1882.

In the accompanying drawings, A represents the said return-pipe, connected to which are one or more branch pipes, B, which may be of any desired length, according to the number of vats they have to supply. These pipes A and B are connected by suitable means. We have shown short lengths of pipes C and couplings D. To each of these branch pipes B are connected one or more sections, E, which are bent, substantially as shown, so as to enter their respective vats F, the point of connection between these branch pipes and sections being outside of the vats and at a point below the top edge thereof, so that by any leaking of the joints, or when any section is uncoupled, brine will not enter the vats and destroy the beer. These sections we have shown connected to the pipes B by means of short lengths of pipes G and couplings H. The other ends of these sections connect with a pipe or pipes, I, at a point outside the vats and beneath the upper edge thereof, preferably by means of short lengths J and couplings K, which are closed at one end and communicate at the other with a pipe, L. The connection between the pipe or pipes I and the pipe L is preferably made by means of short lengths M and couplings N. The short lengths C, G, J, and M are respectively provided with a suitable cock or valve to control and regulate the flow of brine. If any one of the sections becomes clogged, so that the brine will not pass through it, its valves are closed, when it can be removed and cleaned.

In these refrigerating apparatuses—such as that of Mr. Mayer's—the brine, as it is taken back to the cooling-tank, is sufficiently cold for thus cooling the beer while fermenting, and after it has passed through the sections, accomplishing this purpose, the pipe L conveys it onto the cooling-tank, so that there is no waste.

We claim as our invention—

1. The combination of main pipe A, branch pipe or pipes B, one or more sections, E, vat or vats F, pipe or pipes I, and pipe L, all arranged substantially as and for the purpose set forth.

2. The combination of main pipe A, branch pipes B, sections E, vats F, and pipes I L, the said pipes being provided with valves and the sections being made removable, and being connected to the pipes B and I at points outside the vats and below the upper edge thereof, substantially as and for the purpose set forth.

3. The combination of main pipe A, branch pipes B, sections E, vats F, pipes I, and pipe L, the said pipes being connected together by means of short lengths and couplings, substantially as described, and the lengths being provided with valves for the purpose set forth.

CHARLES G. MAYER.
EDMUND JUNGENFELD.

Witnesses to Charles G. Mayer's signature:
ALF. GROHMANN,
CHAS. ENGELHARD.

Witnesses to Edmund Jungenfeld's signature:
GEO. H. KNIGHT,
GEORGE H. STILLE.